(12) United States Patent  
Hagihara

(10) Patent No.: US 8,028,598 B2  
(45) Date of Patent: Oct. 4, 2011

(54) INJECTION-MOLDED GEAR

(75) Inventor: Toru Hagihara, Kawaguchi (JP)

(73) Assignee: Enplas Corporation, Saitama (JP)

( * ) Notice: Subject to any disclaimer, the term of this patent is extended or adjusted under 35 U.S.C. 154(b) by 595 days.

(21) Appl. No.: 12/150,523

(22) Filed: Apr. 29, 2008

(65) Prior Publication Data

US 2009/0011071 A1 Jan. 8, 2009

(30) Foreign Application Priority Data

May 9, 2007 (JP) .................................. 2007-124103

(51) Int. Cl.  
*F16H 55/17* (2006.01)

(52) U.S. Cl. ........................ 74/431; 74/434; 74/DIG. 10

(58) Field of Classification Search ................. 74/421 R, 74/431, 461, DIG. 10, 434; 425/542, 543, 425/556

See application file for complete search history.

(56) References Cited

FOREIGN PATENT DOCUMENTS

| JP | 4-238008 | * | 8/1992 |
|----|----------|---|--------|
| JP | 08-132542 |   | 5/1996 |
| JP | 2002-347081 | * | 12/2002 |
| JP | 2004-358665 |   | 12/2004 |

* cited by examiner

*Primary Examiner* — William C Joyce  
(74) *Attorney, Agent, or Firm* — DLA Piper LLP (US)

(57) ABSTRACT

A high-strength, high-precision injection-molded gear in which resin flow regulating projections that partially thicken a web are formed in a position on a side surface side of the web between pin point gates and a teeth section such as to project from the side surface of the web. The resin flow regulating projections are formed such that a center section thereof, the highest in height, is on a radial direction line extending from the pin point gates in the outward radial direction and the height gradually decreases away from the position on the radial direction line in a circumferential direction of the web.

3 Claims, 13 Drawing Sheets

INJECTION-MOLDED GEAR

BACKGROUND OF THE INVENTION

1. Field of the Invention

The present invention relates to an injection-molded gear used in a power transmission device in various automobile components, industrial machineries, precision machineries, and the like.

2. Description of the Related Art

In recent years, an injection-molded resin gear (injection-molded gear) is often used in a gear train in automobile components, printers, and the like to achieve lighter weight, quieter operation noise, and the like. The automobile components, printers, and the like operate by receiving driving force from a drive source, such as a motor.

FIRST CONVENTIONAL EXAMPLE

FIG. 7 is a front view of an injection-molded gear 50 of a first conventional example. FIG. 8 is a cross-sectional view of the injection-molded gear 50 taken along line A3-A3 in FIG. 7. FIG. 9 is a cross-sectional view of a mold 51 of the injection-molded gear 50 shown in FIG. 7 and FIG. 8.

The injection-molded gear 50 of the first conventional example shown in FIG. 7 and FIG. 8 is formed by molten resin being injected into a cavity 53 within the mold 51 from a plurality of pin point gates 52. For convenience of explanation, the pin point gates 52 in FIG. 9 are shown in positions corresponding to the injection-molded gear in FIG. 7 and FIG. 8.

In the injection-molded gear 50 of the first conventional example such as this, as shown in FIG. 7 and FIG. 9, when the molten resin is injected into the cavity 53 from the plurality of pin point gates 52, the resin injected from each pin point gate 52 merge in a roughly middle section between adjacent pin point gates 52 (refer to arrow 54 indicating a flow of the molten resin). A weld line 56 is formed in a portion of a web 55 corresponding to the section at which the molten resin merges. When the weld line 56 is formed on the injection-molded gear 50, the weld line 56 not only has an adverse effect on tooth profile accuracy, but may also have an adverse effect on gear strength.

SECOND CONVENTIONAL EXAMPLE

An injection-molded gear 60 shown in FIG. 10 and FIG. 11 has been proposed to solve problems of the injection-molded gear 50 of the first conventional example, such as those described above. In the injection-molded gear 60 of a second conventional example shown in the diagrams, ring-shaped grooves 65 (ring-shaped portions of a web 61 of which thickness is reduced that are referred to as high-polymer material flow regulating mechanisms) are formed on portions that are radial direction outer circumferential edges of side surfaces 62 and 63 of the web 61, as well as inner radial direction side portions of a roughly ring-shaped teeth section 64. The grooves 65 run along inner circumferential surfaces of the teeth section 64. In the injection-molded gear 60 of the second conventional example, the molten resin is injected into the cavity from pin point gates 66. When the flow of the molten resin reaches the portion at which the ring-shaped grooves 65 are formed, the flow of the molten resin is narrowed by the portion at which the ring-shaped grooves 65 are formed. Internal pressure of the molten resin increases. The molten resin with the increasing internal pressure flows to an unfilled section having low pressure. The molten resin fills the entire circumference of the ring-shaped grooves 65. After the internal pressure of the molten resin equalizes, the molten resin evenly fills the cavity, from the web 61 side towards the teeth section 64 side (refer to Patent Literature 1). In the injection-molded gear 60 of the second conventional example, groove depths of the ring-shaped grooves 65 continuously or intermittently change along the inner circumferential surfaces of the teeth section 64.

THIRD CONVENTIONAL EXAMPLE

Like the second conventional technology, an injection-molded gear 70 in FIG. 12 and FIG. 14 has been proposed to solve the problems of the injection-molded gear 50 of the first conventional example. In the injection-molded gear 70 of a third conventional example shown in the diagrams, resin flow speed adjusting grooves 74 that reduce thickness of a web 71 is formed in on a side surface 72 of a web 71 in positions in an outward radial direction of portions at which pin point gates 73 open. An outer circumference side circumferential direction groove 76 is formed on the side surface 72 of the web 71 between the resin flow speed adjusting groove 74 and the teeth section 75. The outer circumference side circumferential direction groove 76 runs along an inner circumferential surface of the teeth section 75.

In the injection-molded gear 70 of the third conventional example, the molten resin is injected into a cavity (77) from the pin point gates 73. When the flow of the molten resin reaches portions forming the resin flow speed adjusting grooves 74, the flow of the molten resin is narrowed by the portions forming the resin flow speed adjusting grooves 74. The speed of a flow of molten resin in an outward radial direction (towards the teeth section 75 side) is equalized (a first stage flow speed equalization is performed). The flow of the molten resin that has passed the portions forming the resin flow speed adjusting grooves 74 is further narrowed when passing through a portion forming the outer circumference side circumferential direction groove 76. The speed of the flow of molten resin is further equalized (a second stage flow speed equalization is performed). Therefore, the speed of the flow of molten resin within the web 71 before the molten resin reaches the teeth section 75 on which teeth 78 are formed on an outer circumferential side is equalized (refer to Patent Literature 2). In the injection-molded gear 70 of the third conventional example, groove depths of the resin flow speed adjusting grooves 24 change so as to be deep in positions near the pin point gates 73 and to become shallower the farther the resin flow speed adjusting grooves 24 are from the pin point gates 73. Narrowing rate of the flow of the molten resin changes depending on the speed of the flow of the molten resin injected into the cavity (77) from the pin point gates 73.

Patent Literature 1: Japanese Patent Laid-open Publication No. Heisei 8-132542 (refer to page 2, FIG. 1 and FIG. 2)

Patent Literature 2: Japanese Patent Laid-open Publication No. 2004-358665 (refer to page 1, FIG. 1 to FIG. 3)

In the injection-molded gear 60 of the second conventional example and the injection-molded gear 70 of the third convention example, the depths of the ring-shaped grooves 65 and the resin flow speed adjusting grooves 74 can be sufficiently deepened when the web 61 and the web 71 are sufficiently thick. The flow of molten resin flowing in the outward radial direction (towards the teeth section) after the molten resin is injected into the cavities from the pin point gates 66 and the pin point gates 73 can be effectively narrowed. The flow of the molten resin can be controlled. Therefore, the speed of the flow of molten resin can be equalized. The weld line formed at the section at which the molten resin merges can be sufficiently reduced.

However, in the injection-molded gear 60 of the second conventional example and the injection-molded gear 70 of the third convention example, the depths of the ring-shaped grooves 65 and the resin flow speed adjusting grooves 74 can not be sufficiently deepened when the web 61 and the web 71 are thin. The flow of molten resin flowing in the outward radial direction (towards the teeth section 64 and the teeth section 75) after the molten resin is injected into the cavities from the pin point gates 66 and the pin point gates 73 can be sufficiently controlled. Therefore, the speed of the flow of molten resin cannot be sufficiently equalized. The weld line formed at the section at which the molten resin merges cannot be sufficiently reduced.

SUMMARY OF THE INVENTION

Therefore, an object of the present invention is to provide a high-strength, high-precision injection-molded gear in which a speed of flow of molten resin injected into a cavity from pin point gates can be equalized and a weld line formed in a section at which the molten resin merges can be reduced.

The invention is related to an injection-molded gear in which a plurality of pin point gates open on a section within a cavity forming a roughly disk-shaped web, molten resin injected into the cavity from the plurality of pin point gates flow within the cavity in an outward radial direction, and a teeth section is formed on an outer circumference of the web. In the invention, resin flow regulating projections that partially thicken the web are formed in positions on a side surface side of the web between the pin point gates and the teeth section such as to project from the side surface of the web. The resin flow regulating projections are formed such that a projection height is, at a center thereof, the highest on a radial direction line extending from the pin point gate in the outward radial direction and decreases away from the position of the radial direction line in a circumferential direction of the web.

The invention is further an injection-molded gear in which the resin flow regulating projections have an arc shape at least near the position on the radial direction line.

The present invention is configured such that the resin flow regulating projections project from a side surface of the web. Therefore, regardless of the thickness of the web, the speed of the flow of molten resin injected into the cavity from the pin point gate can be equalized and the weld line formed on the merging section of the molten resin can be sufficiently reduced. As a result, the present invention can provide a high-strength, high-intensity injection-molded gear.

DETAILED DESCRIPTION OF THE PREFERRED EMBODIMENT

Embodiments of the present invention will be described in detail, below, with reference to the drawings.

Figure 1:
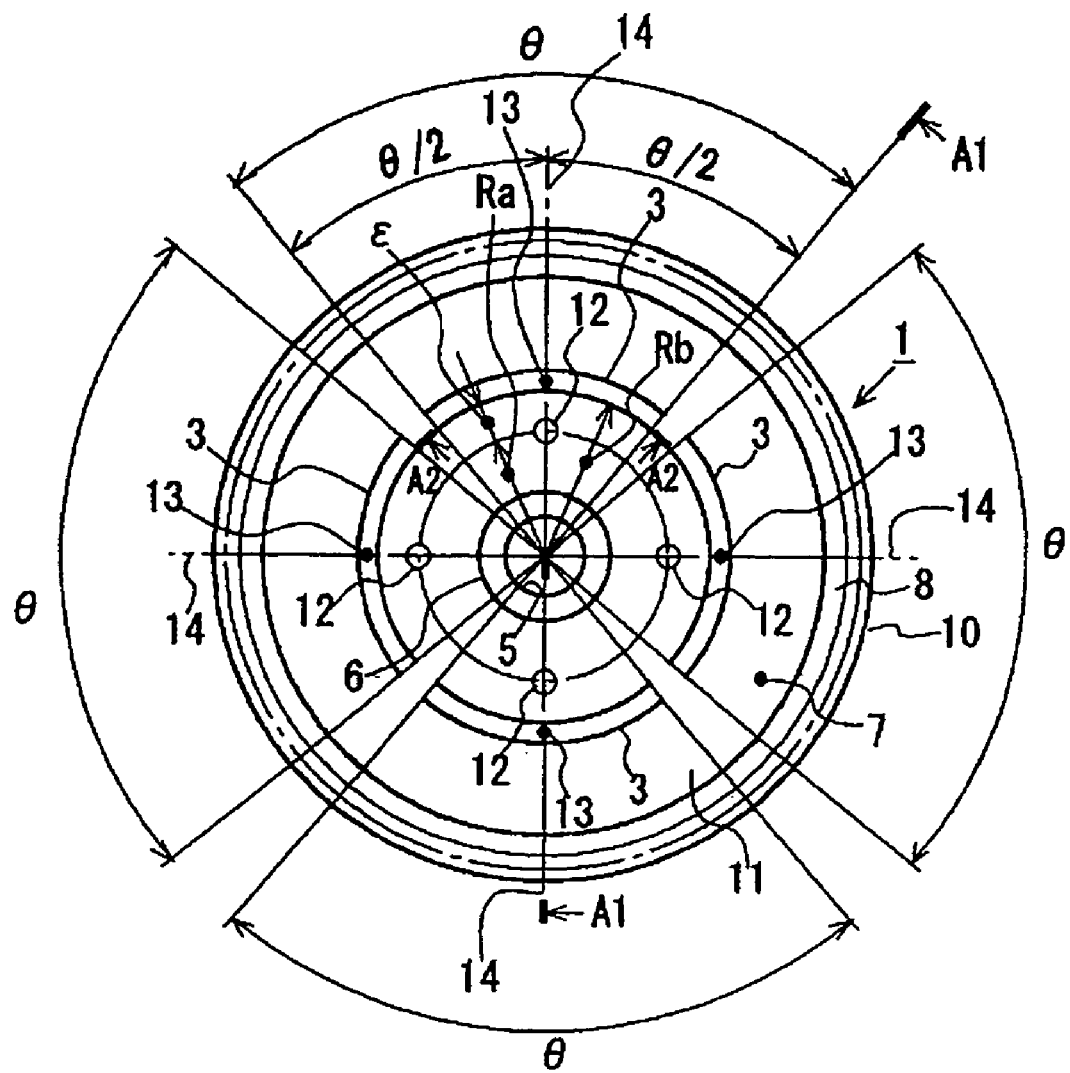
FIG. 1 is a front view of an injection-molded gear 1 of the present invention.
Figure 2:
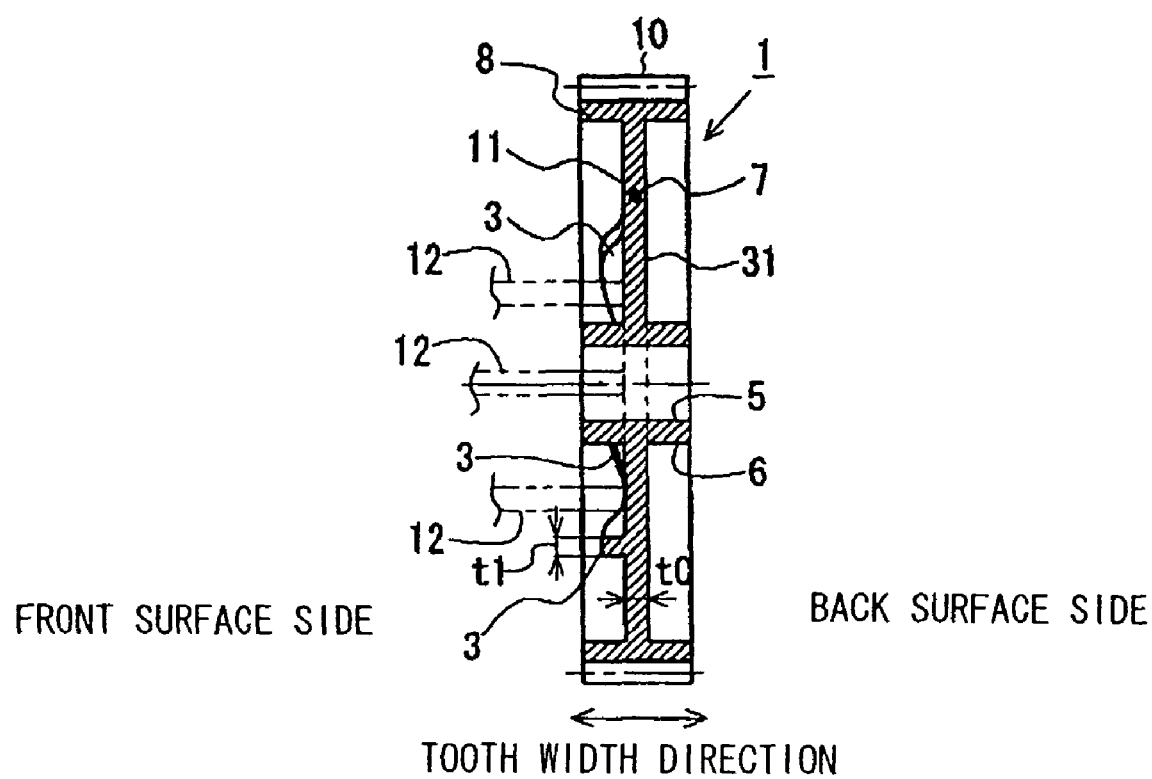
FIG. 2 is an overall cross-sectional view of the injection-molded gear 1 taken along line A1-A1 in FIG. 1.
Figure 3:
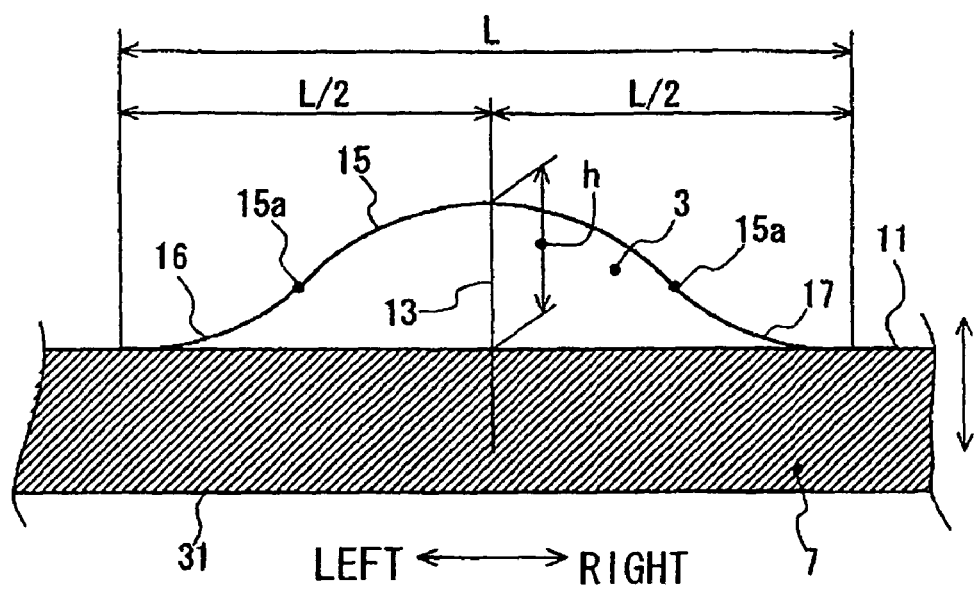
FIG. 3 is a partial cross-sectional view of the injection-molded gear 1 taken along line A2-A2 in FIG. 1, in which a resin flow regulating projection is enlarged.
Figure 4:
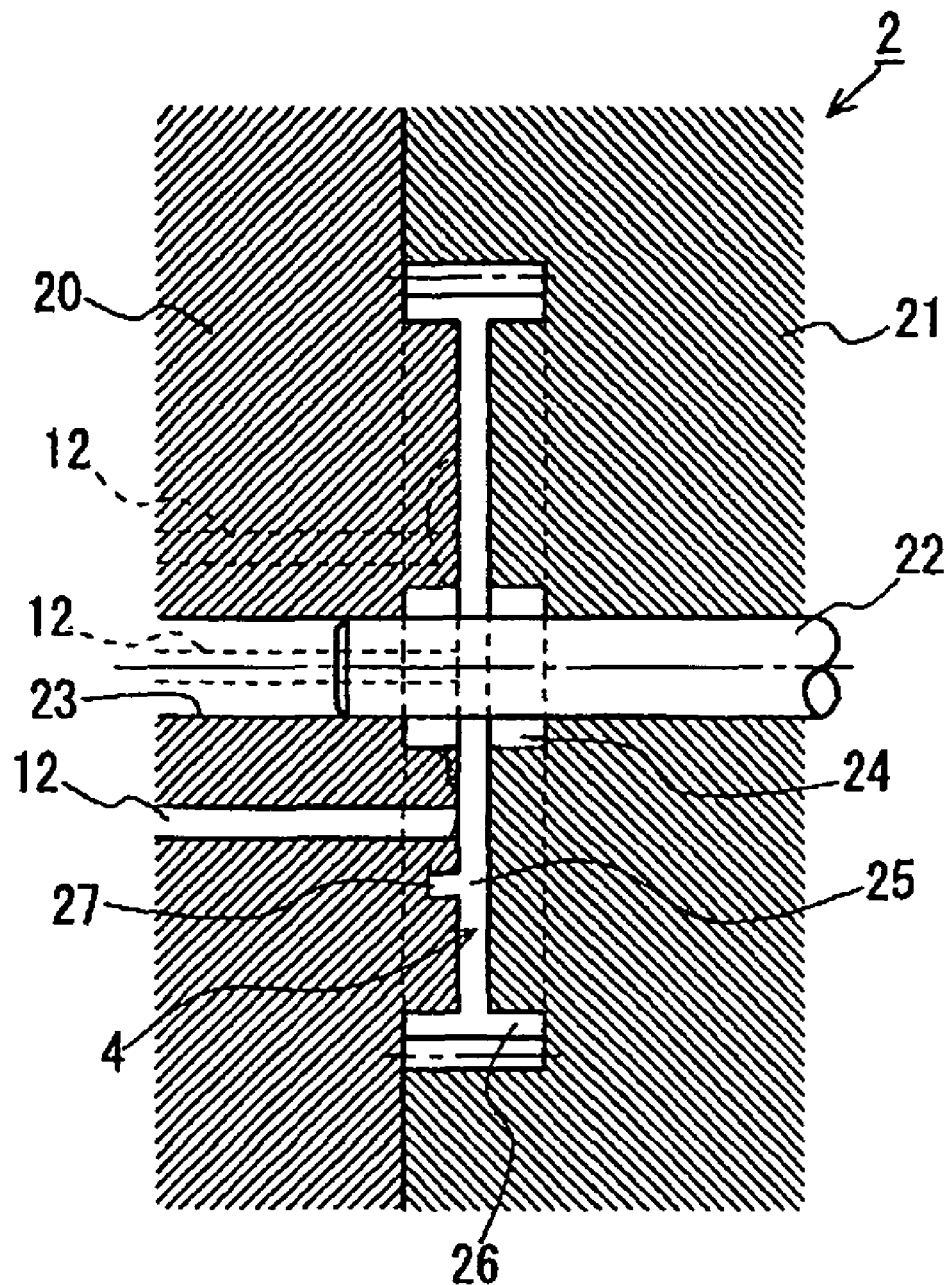
FIG. 4 is a cross-sectional view of a mold used to manufacture the injection-molded gear of the present invention.

FIG. 1 to FIG. 3 show an injection-molded gear 1 according to an embodiment of the present invention. FIG. 4 is a cross-sectional view of a mold 2 used to manufacture the injection-molded gear 1 according to the embodiment. FIG. 1 is a front view of the injection-molded gear 1 according to the embodiment. FIG. 2 is an overall cross-sectional view of the injection-molded gear 1 taken along line A1-A1 in FIG. 1. FIG. 3 is a partial cross-sectional view of the injection-molded gear 1 taken along line A2-A2 in FIG. 1, in which a resin flow regulating projection 3 is enlarged.

(Injection-Molded Gear)

The injection-molded gear 1 is formed by molten resin being injected into a cavity 4 of a mold 2. The molten resin is, for example, polyacetal, polyamide, polyphenylene sulfide, and polybutylene terephthalate (see FIG. 2 and FIG. 4).

As shown in FIG. 1 to FIG. 3, the injection-molded gear 1 includes a cylindrical boss section 6, a disk-shaped web 7, and a teeth section 8. An axis hole 5 into which an axis (not shown) is fitted is formed in the boss section 6. The web 7 extends from an outer circumference of the web 7 in an outward radial direction. The teeth section 8 is formed in a shape of a ring on an outer circumferential edge of the web 7. A plurality of teeth 10 are formed on an outer circumference of the teeth section 8. A plurality of resin flow regulating projections 3 are formed so as to project from one side surface (front-side side surface) 11 of the web 7. The resin flow regulating projections 3 are formed evenly spaced along a circumferential direction (90° apart). The web 7 is connected at a tooth width direction center section of the ring-shaped teeth section 8.

The resin flow regulating projections 3 are formed at positions corresponding to pin point gates 12 opening into the cavity 4 of the mold 2. The resin flow regulating projections 3 are formed in positions between the pin point gates 12 and the teeth section 8. A resin flow regulating projection 3 is formed such that a center section 13 is positioned on a radial direction line 14 extending from a center of a pin point gate 12 in an outward radial direction. The resin flow regulating projection 3 extends form the center section 13 to a θ/2 position in a clockwise direction along the circumferential direction and to a θ/2 position in a counter-clockwise direction along the circumferential direction. A length of the resin flow regulating projection 3 along the circumferential direction is within an angle range of θ (θ≦π/2).

As shown in FIG. 1 and FIG. 3, a contour of the resin flow regulating projection 3 is shaped by an arc-shaped curved line 15 and arc-shaped curved lines 16 and 17. The arc-shaped curved line 15 curves upwards. The arc-shaped curved lines 16 and 17 curve downward. The arc-shaped curved lines are smoothly connected to both ends 15a and 15b of the arc-shaped curved line 15. The resin flow regulating projection 3 is formed so that a projection height h (a length by which the resin flow regulating projection 3 projects from the one side surface 11 of the web 7 towards a front surface side [upwards in FIG. 3]) is the highest at the center section 13 that is a position on the radial direction line 14 extending from the center of the pin point gate 12 in the outward radial direction. The projection height h gradually decreases away from the center section 13 along the circumferential direction. The projection height h is zero at positions θ/2 away from the center section 13 in the clockwise direction and the counterclockwise direction along the circumferential direction. The resin flow regulating projection 3 is formed so that the left side and right side of the center section 13 are symmetrical. A thickness t1 of the resin flow regulating projection 3 is the same thickness as a thickness t0 of the web 7 (t1=t0). However, the thickness t1 is not limited thereto and is set to a thickness of at least about 1 millimeter.

The projection height h at the center section, a length L (L=Rb·θ [where, angle θ is in radian units]) along the circumferential direction, and the contour shape of the resin flow regulating projection 3 are set accordingly to appropriate dimensions depending on a radial direction dimension ε (ε=Rb−Ra) from the center of the pin point gate 12, an area of the opening of the pin point gate 12 into the cavity 4, injection conditions (such as injection pressure and injection amount per unit of time) for the molten resin, and the like.

The resin flow regulating projection 3 are formed in correspondence with the pin point gates 12. Therefore, four resin flow regulating projections 3 are formed in correspondence with four pin point gates 12.

(Mold)

FIG. 4 is a diagram of an overall configuration of the mold 2 used to manufacture the injection-molded gear 1 such as that described above.

In the mold 2, the cavity 4 is formed on a side of a surface on which a first mold 20 and a second mold 21 are butted against each other. An axis mold 22 that is engaged with the second mold 21 to allow sliding passes through the cavity 4 and engages with an axis mold receiving hole 23 in the first mold 20. The cavity 4 (a space to be filled with the molten resin) is formed in the shape of the injection-molded gear 1 shown in FIG. 1 to FIG. 3. The axis mold 22 is used to form the boss section 6 of the injection-molded gear 1 and the axis hole 5 in the boss section 6.

In the cavity 4, a section 24 corresponding to the boss section 6 of the injection-molded gear 1, a section 25 corresponding to the web 7, a section 26 corresponding to the teeth section 8, and a section 27 corresponding to the resin flow regulating projection 3 are formed. The four pin point gates 12 are disposed evenly spaced around the axis mold receiving hole 23 of the first mold 20. The pinpoint gates 12 open into the section 25 of the cavity 4 corresponding to the web 7, between the section 24 of the cavity 4 corresponding to the boss section 6 and the section 27 of the cavity 4 corresponding to the resin flow regulating projection 3.

In the mold 2 configured as described above, the molten resin injected into the cavity 4 from the pin point gates 12 spreads such as to radiate within an interior space of the cavity 4. A speed of a flow of the molten resin injected from the pin point gate 12 and flowing towards the section 26 corresponding to the teeth section 8 (outward radial direction side) is adjusted by the section 27 corresponding to the resin flow regulating projection 3. The speed of the flow is equalized at the section 25 corresponding to the web 7 between the section 27 corresponding to the resin flow regulating projection 3 and the section 26 corresponding to the teeth section 8.

Figure 5:
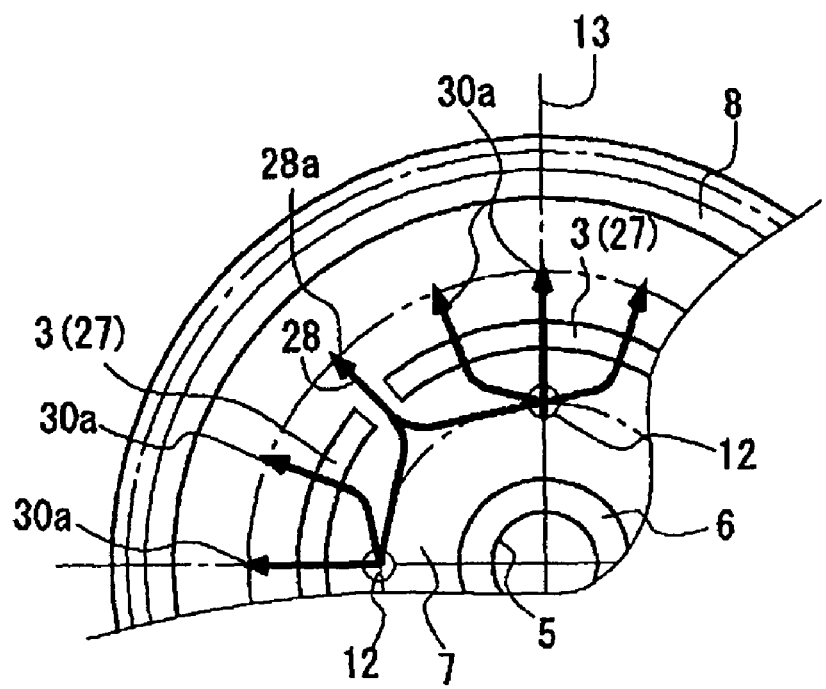
FIG. 5 is a diagram for explaining a function of the resin flow regulating projection of the present invention, showing a state in which molten resin is flowing.

In other words, the section 27 of the cavity 4 corresponding to the resin flow regulating projection 3 is shaped to have the largest flow path cross-section area at a position closest to the pinpoint gate 12 (a cross-section area of the section 27 corresponding to the resin flow regulating projection 3 taken along the radial direction). The flow path cross-section area decreases away from the pin point gate 12. Therefore, the section 27 of the cavity 4 corresponding to the resin flow regulating projection 3 functions to align a tip 28a of a resin flow 28 at a merging section (a flow in which flows of resin injected from adjacent pin point gates 12 merge and flow in the outward radial direction) and a tip 30a of a resin flow 30 along the circumferential direction of the web 7 (see FIG. 5). The resin flow 30 passes through the section 27 corresponding to the resin flow regulating projection 3 and flows in the outward radial direction.

Effects of the Embodiment

As described above, the injection-molded gear 1 according to the embodiment is configured such that the resin flow regulating projections 3 project from the side surface 11 of the web 7 that is the side surface 11 between the positions of the pin point gates 12 in the mold 2 and the teeth section 8. Therefore, regardless of the thickness of the web 3, the speed of the flow of molten resin injected into the cavity 4 from the pinpoint gates 12 can be equalized. The weld line formed in the merging section 28 of the molten resin can be sufficiently reduced. As a result, in the present invention, a high-strength and high-precision injection-molded gear 1 can be provided.

Variation Examples

According to the above-described embodiment, the resin flow regulating projections 3 are disposed on one side surface 11 side (the front-surface side surface 11 side) of the web 7 on which the pin point gates 12 open. However, this is not limited thereto. The resin flow regulating projections 3 can be disposed on another side surface 31 side (a back-surface side surface 31 side) of the web 7. Alternatively, the resin flow regulating projections 3 can be disposed on both side surface (the one side surface 11 and the other side surface 31) sides of the web 7. When the resin flow regulating projections 3 are formed on both side surfaces 11 and 31 of the web 7, compared to when the resin flow regulating projections 3 are formed on either the one side surface 11 or the other side surface 31 of the web 7, the projection height of the resin flow regulating projection 3 can be roughly halved. However, in any case, the resin flow regulating projections 3 are formed on the web 7 between the pin point gates 12 and the teeth section 8 as according to the above-described embodiment.

Figure 6:
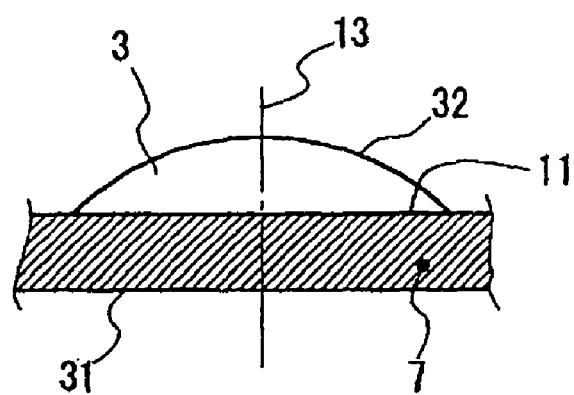
FIG. 6 is an enlarged view of a resin flow regulating projection of a variation example of the present invention, corresponding to FIG. 3.
Figure 7:
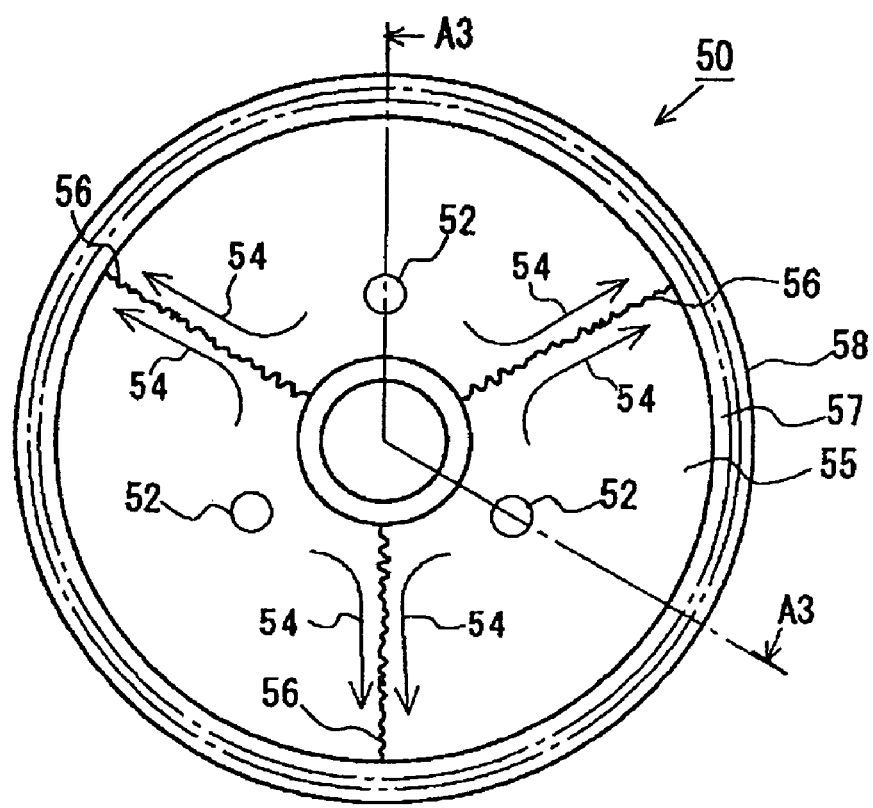
FIG. 7 is a front view of an injection-molded gear of a first conventional example.
Figure 8:
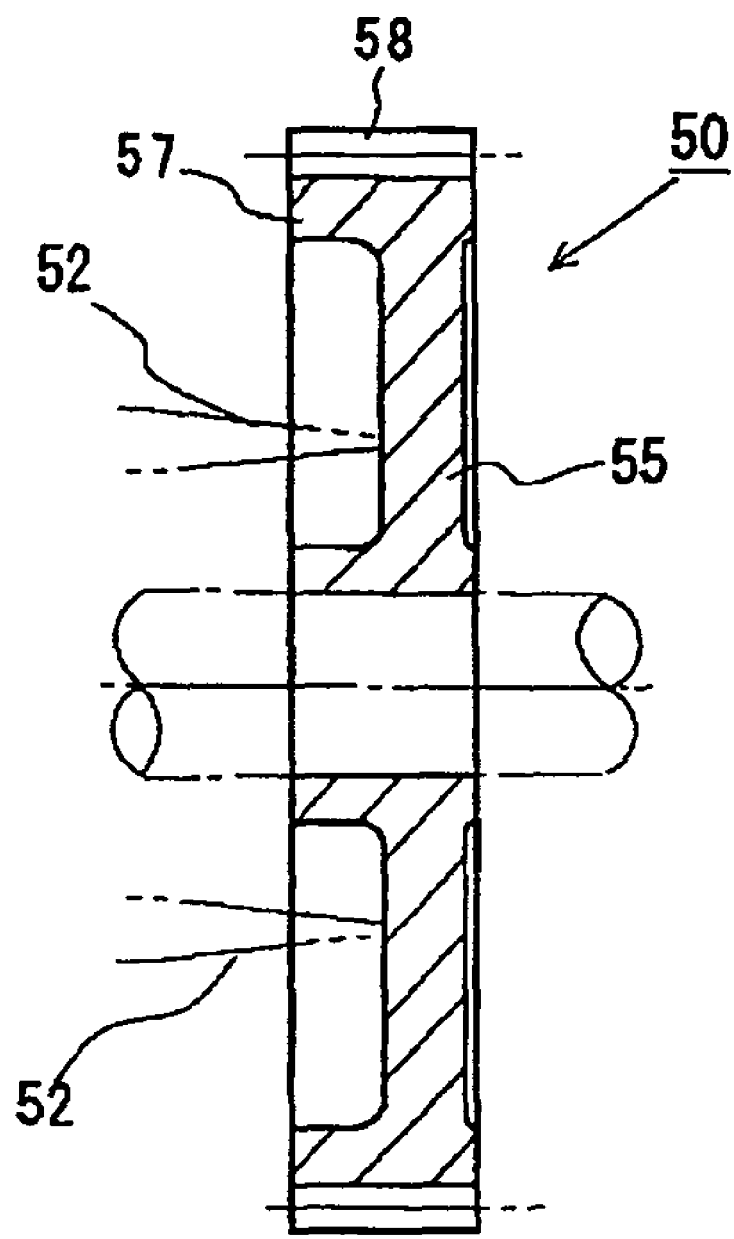
FIG. 8 is across-sectional view of the injection-molded gear taken along line A3-A3 in FIG. 7.
Figure 9:
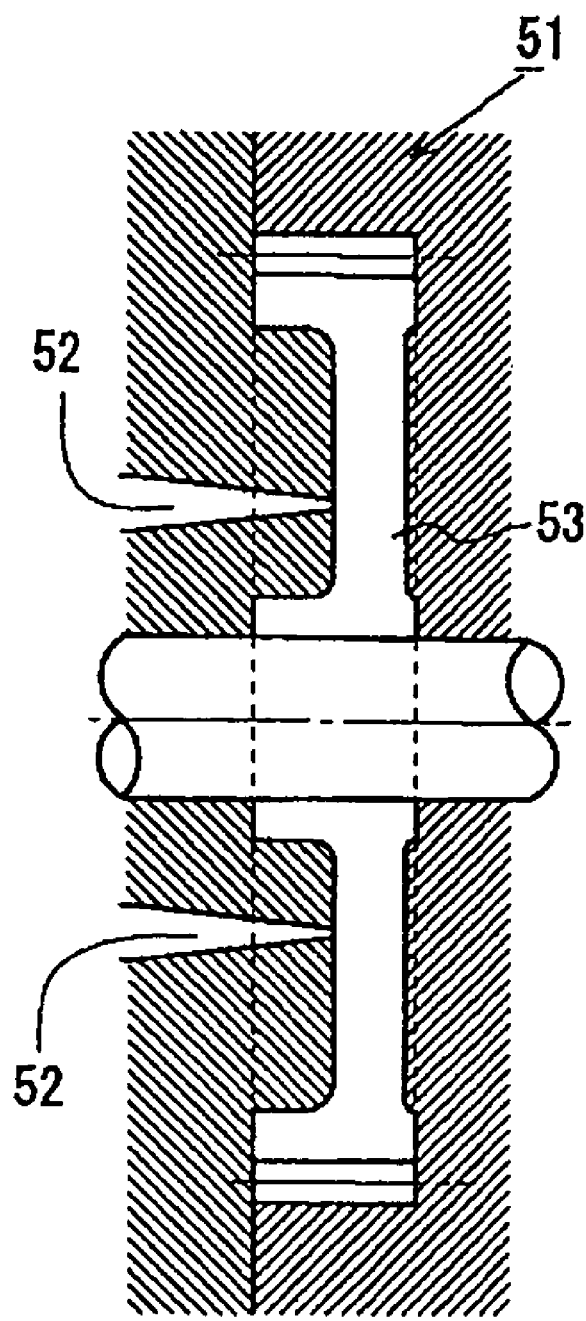
FIG. 9 is a cross-sectional view of a mold for the injection-molded gear shown in FIG. 7 and FIG. 8.
Figure 10:
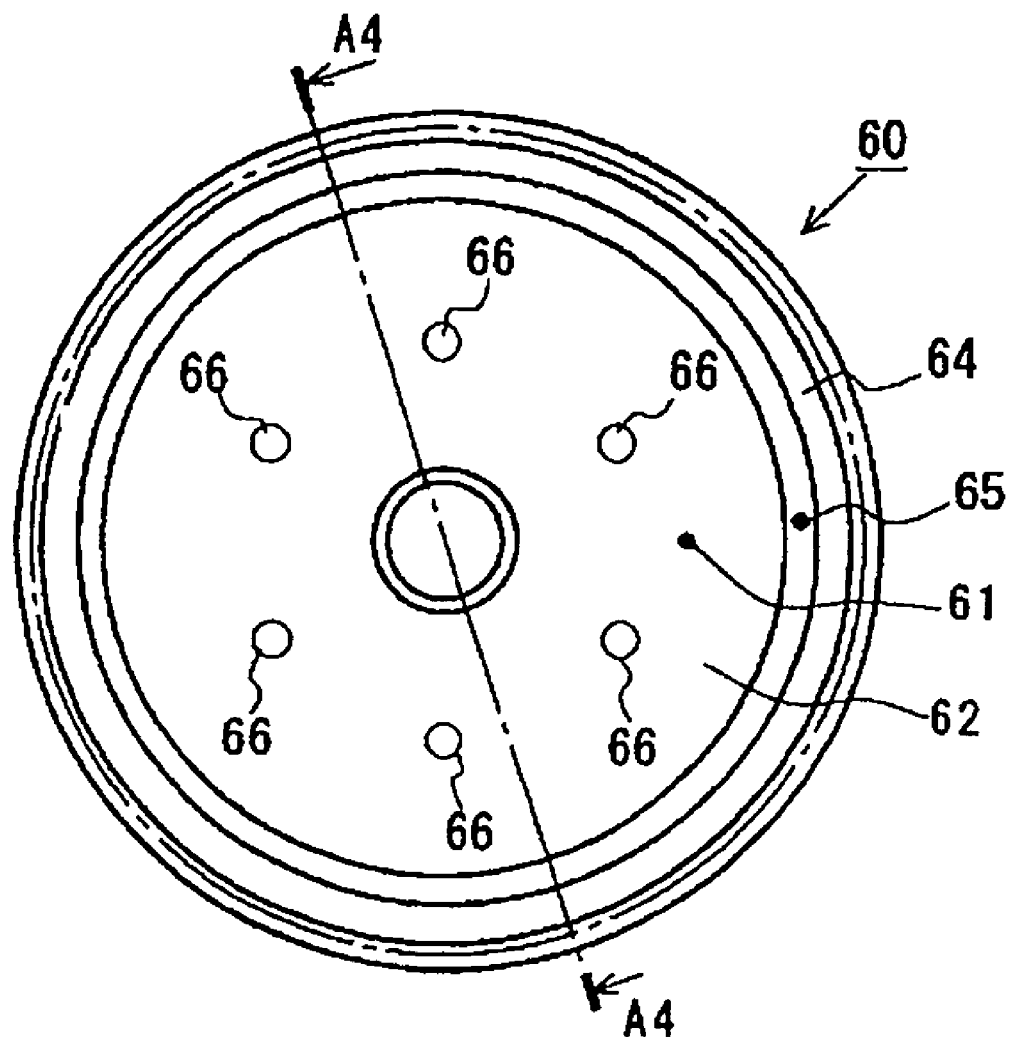
FIG. 10 is a front view of an injection-molded gear of a second conventional example.
Figure 11:
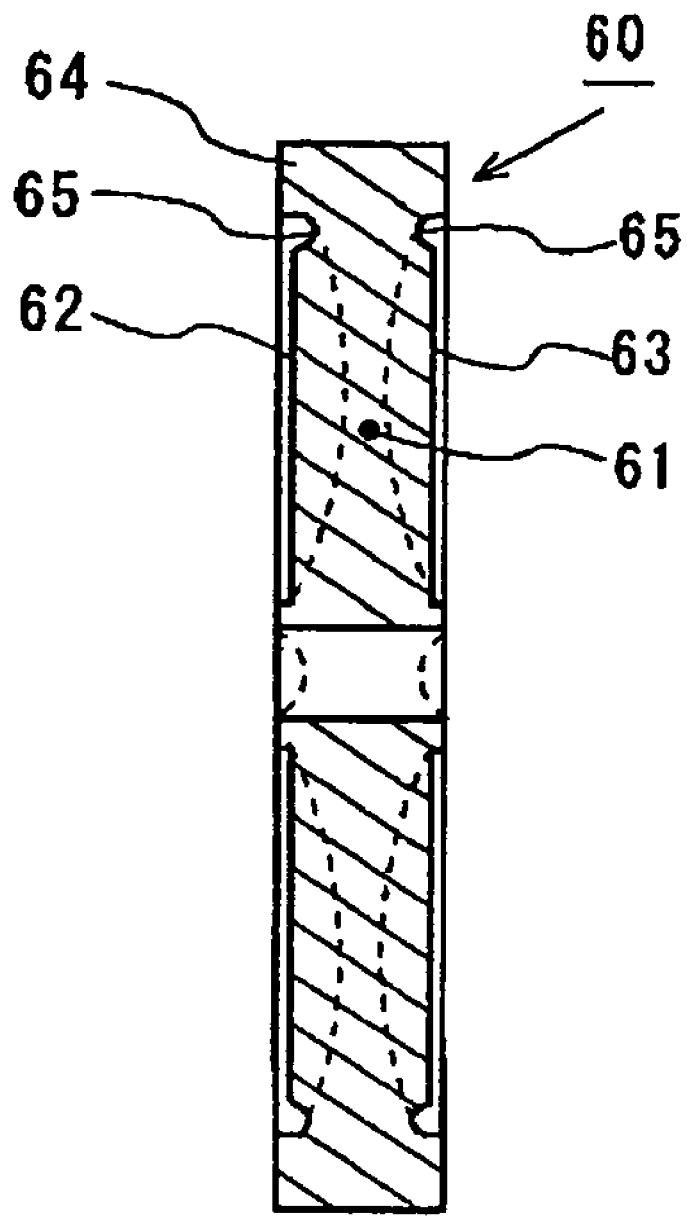
FIG. 11 is a cross-sectional view of the injection-molded gear taken along line A4-A4 in FIG. 10.
Figure 12:
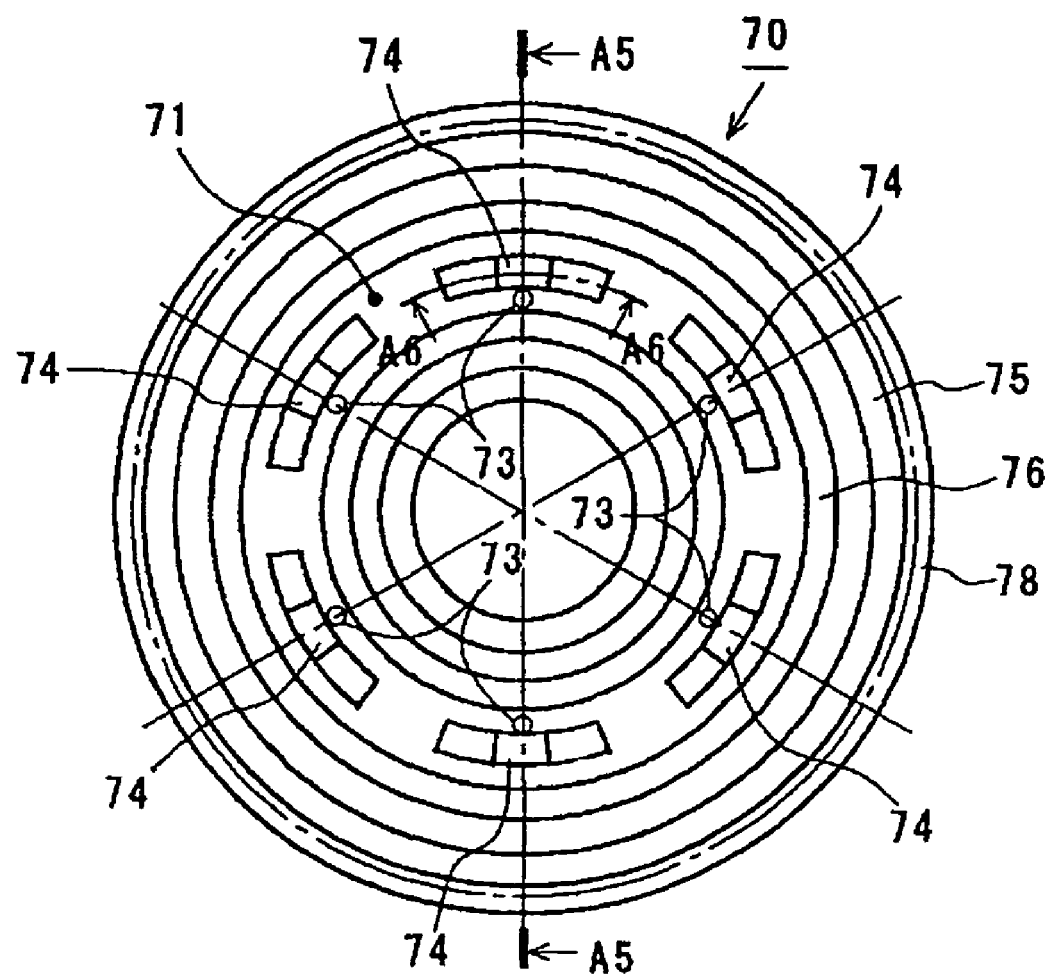
FIG. 12 is a front view of an injection-molded gear of a third conventional example.
Figure 13:
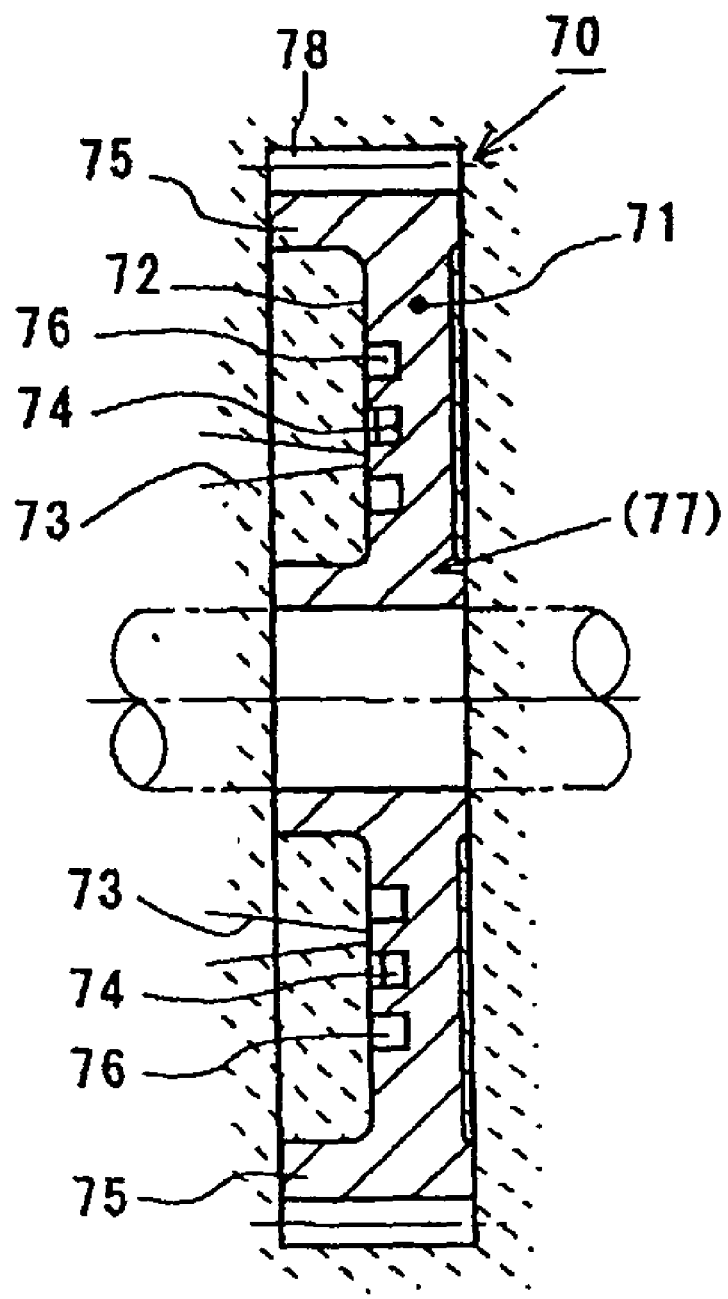
FIG. 13 is a cross-sectional view taken along line A5-A5 in FIG. 12.
Figure 14:
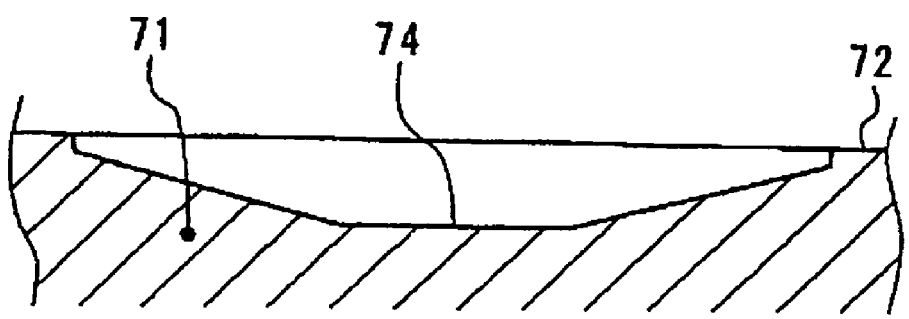
FIG. 14 is an enlarged cross-sectional view of a portion of the injection-molded gear taken along line A6-A6 in FIG. 12.

The resin flow regulating projection 3 according to the above-described embodiment is shaped by the arc-shaped curved lines 16 and 17 that curve downward being smoothly connected to both ends 15a and 15b of the arc-shaped curved line 15 that curves upwards, as shown in FIG. 3. However, this is not limited thereto. The contour can be a simple arc-shaped curved line 32 appearing to be a portion cut away from a circle (see FIG. 6). In the present invention, the resin flow regulating projection 3 is merely required to have an arc shape that curves upwards at least near the position on the radial direction line at which the height of the projection is the highest, in which the height of the projection gradually decreases away from the position on the radial direction line 14 in the circumferential direction.

What is claimed is:

1. An injection-molded gear in which a plurality of pin point gates open on a section within a cavity forming a roughly disk-shaped web, molten resin injected into the cavity from the plurality of pin point gates flow within the cavity in an outward radial direction, and a teeth section is formed on an outer circumference of the web, wherein:
  resin flow regulating projections that partially thicken the web are formed on a side surface side of the web so as to project therefrom and evenly spaced along a circumferential direction between each of the pin point gates and the teeth section; and
  each of the resin flow regulating projections is formed such that a center section thereof is positioned on a radial direction line extending from the pin point gate in the outward radial direction, that a height at the center section thereof is the highest, and that the height thereof decreases away from a position on the radial direction line in a circumferential direction of the web and becomes at both ends thereof the same as the side surface of the web.

2. The injection-molded gear according to claim 1, wherein the resin flow regulating projections have an arc shape with left side and right side of the center section thereof being symmetrical.

3. The injection-molded gear according to claim 2, wherein a contour of the arc shape of the resin flow regulating projection is comprised of an upwardly arc-shaped curved line and downwardly arc-shaped curved lines that are smoothly connected to both ends of the upwardly arc-shaped curved line.

* * * * *